(12) United States Patent
Nishimura et al.

(10) Patent No.: US 6,756,018 B2
(45) Date of Patent: Jun. 29, 2004

(54) METHOD AND APPARATUS FOR SELECTIVE EXECUTION OF MICROFLUIDIC CIRCUITS UTILIZING ELECTRICALLY ADDRESSABLE GAS GENERATORS

(75) Inventors: Ken A. Nishimura, Fremont, CA (US); Danny E. Mars, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 441 days.

(21) Appl. No.: 09/782,544

(22) Filed: Feb. 12, 2001

(65) Prior Publication Data

US 2002/0137229 A1 Sep. 26, 2002

(51) Int. Cl.[7] .................................................. B01L 3/02
(52) U.S. Cl. ........................ 422/100; 422/99; 422/102; 436/174; 436/180; 436/181
(58) Field of Search ......................... 422/99, 100, 102, 422/103; 436/174, 180, 181; 137/806, 807, 825

(56) References Cited

U.S. PATENT DOCUMENTS

| | | | | |
|---|---|---|---|---|
| 5,855,801 A | * | 1/1999 | Lin et al. ........................ 216/2 |
| 5,942,443 A | * | 8/1999 | Parce et al. .................. 436/514 |
| 5,992,820 A | * | 11/1999 | Fare et al. ............. 251/129.01 |
| 6,057,149 A | * | 5/2000 | Burns et al. ............. 435/287.2 |
| 6,065,864 A | * | 5/2000 | Evans et al. ............. 366/167.1 |
| 6,068,751 A | | 5/2000 | Neukermans ................ 204/601 |
| 6,120,665 A | * | 9/2000 | Chiang et al. ............... 204/450 |
| 6,130,098 A | * | 10/2000 | Handique et al. ........... 436/180 |
| 6,154,237 A | * | 11/2000 | Kashino et al. ................ 347/48 |

* cited by examiner

*Primary Examiner*—Jill Warden
*Assistant Examiner*—Dwayne K Handy

(57) ABSTRACT

A microfluidic system for steering subject materials to a next processing region includes a substrate having at least one embedded gas generator that is activated in response to the result of an initial process, whereby a gas is formed having pressure to steer the subject materials to the next processing region. The gas generator includes resistors that are electrically activated. As current passes through the resistors, thermal energy is released to decompose a selected material from a solid or liquid state to gaseous state. In an alternative embodiment, a gas generator is activated in response to an external control.

19 Claims, 6 Drawing Sheets

METHOD AND APPARATUS FOR SELECTIVE EXECUTION OF MICROFLUIDIC CIRCUITS UTILIZING ELECTRICALLY ADDRESSABLE GAS GENERATORS

TECHNICAL FIELD

The invention relates generally to microfabricated devices and more particularly to microfluidic devices for chemical and biological analysis, and chemical synthesis.

BACKGROUND ART

Microfluidic technology may be utilized to create systems that can perform chemical and biological analysis, and chemical synthesis on a much smaller scale than previous laboratory equipment and techniques. Microfluidic systems offer the advantages of requiring a smaller sample of analyte or reagent for analysis or synthesis, and dispensing a smaller amount of waste materials. Since the testing or combining is self-contained within the microfluidic system, analysis or synthesis can be performed in virtually any location inside or outside of the laboratory.

The microfluidic systems may be used for analytical and fine chemistry, biological sciences, clinical testing, combinatorial synthesis, environmental or forensic testing, and the like. Microfluidic systems for analysis, chemical and biological processing, and sample preparation may include some combination of the following elements: pre- and post-processing fluidic handling components, microfluidic-to-system interface components, electrical and electronic components, environmental control components, and data analysis components. A popular use of microfluidic systems is in the analysis of DNA molecules for testing infectious or genetic diseases or screening for genetic defects. Another popular use is in forensic sciences where immediate results of blood samples may be obtained.

In addition to the reduction of the microfluidic component down to the size of a "chip" (i.e., a semiconductor die), recent advances have allowed the simultaneous execution of multiple tasks on a single component. The capability of simultaneously performing multiple tasks has greatly enhanced the utility of microfluidic devices. Moreover, the time required to obtain the desired results is reduced.

The general principle behind a microfluidic device is that all the elements of the device are reduced to a microscopic scale. These elements may include fluid reservoirs, channels, testing regions, mixing chambers, etc. Each element is generally fabricated on the micron or submicron scale. For example, typical channels or regions have at least one cross-sectional dimension in the range of about 0.1 microns to about 500 microns.

FIG. 1 illustrates a conventional microfluidic system 10 fabricated on a substrate 12. The microfluidic substrate is made of a material such as polymer, glass, silicon, or ceramic. Polymers are the preferred substrate materials, with polyimide being the most preferred. Polymer materials that are particularly suitable include materials selected from the following classes: polyimide, PMMA, polycarbonate, polystyrene, polyester, polyamide, polyether, polyolefin, and mixtures of these materials.

The exemplary microfluidic system 10 is a planar device that includes an internal region 14 having input/output ports 16 and 18 and further includes an internal separation channel 20 having input/output ports 22 and 24. The internal region 14 and the separation channel 20 are shown as dashed lines, since they are formed within the substrate 12 of the microfluidic system 10. The dashed lines are interrupted at the intersection of the channel from region 14 with the channel from the separation channel 20, because the two channels intersect. Other configurations are possible and may have, for example, multiple internal regions, additional input and output ports, and a network of channels located within a substrate of a microfluidic system. The term "internal region" is used herein to describe a generally enclosed portion of the microfluidic system in which particular sample preparation processes are performed. Such processes include, but are not limited to, mixing, labeling, testing, filtering, extracting, precipitating, digesting, synthesizing and the like. Movement of the subject material within the device is generally facilitated by manipulation of an external force.

Performed within a typical microfluidic system are a number of tests, wherein the subject material can be processed in either a serial or parallel fashion depending on the individual test requirements. In the process of performing the tests, it is possible that the result from an earlier test will be used to determine which subsequent test will be performed on the subject material within the same microfluidic system. For example, if the result in Test Area #1 is positive, then the subject material will be directed to Test Area #2, where a subsequent analysis is performed based on the results of Test Area #1. Conversely, if the result of Test Area #1 is negative, then the subject material will be directed to Test Area #3. Accordingly, a method is needed for steering the subject material through a network of fluidic channels in response to the initial test result.

One known technique which attempts to steer the subject material to the appropriate testing region as a function of the prior test result involves having an external port at each decision point, so that an external force would be utilized to steer the subject material in one of two or more directions. However, in the case of a cascade of tests with even a small number of decisions, the number of required external ports is large. Large numbers of external fluidic ports are troublesome, as each fluidic port needs to be routed to the decision point independently of other ports.

Another known technique for routing the subject material involves using valves that extend and retract through the microfluidic device. Unfortunately, this technique requires moving mechanical parts that are often susceptible to failure.

Consequently, what is needed is a microfluidic system and a method for steering subject material to its appropriate testing region without the use of external ports or moving parts.

SUMMARY OF THE INVENTION

The present invention is a microfluidic system for directing an analyte, reagent, or similar subject material to a next region of interest, which may be a testing region, detecting region, controlling region, reaction region or the like. The microfluidic system is fabricated on and within a substrate comprising a network of channels and gas generators that are strategically located along the network of channels. As the gas generators are activated, the gas molecules contained within the gas generators expand and push the subject material along selected channels of the networks of channels. By strategically activating a particular gas generator, the subject material can be steered along a desired channel to its appropriate location of interest.

The microfluidic system may be formed using integrated circuit fabrication techniques, such as photolithographic processes, wet or dry chemical etching, or laser ablation. Alternatively, traditional machining techniques may be used. The microfluidic system may also be fabricated by indirect means such as injection molding, hot embossing, casting, or other processes that utilize a mold or patterned tool to form the features of the system. The microfluidic substrate is made of a material such as polymer, glass, silicon, metal, or ceramic. A polymer such as polyimide or polymethylmethacrylate (PMMA) is preferred.

While the microfluidic system is described as including a substrate, this is not critical to the invention. Rather, the microfluidic system can be fabricated on or within a body, housing and supporting structure, and the like, without diverting from the scope of the invention.

In the preferred embodiment, the gas generator that is utilized to direct the gas for manipulating the subject material in the channels includes microscopic resistors that are electrically activated. As current passes through a resistor, electrical energy is transferred into thermal energy. Each resistor is adjacent to a gas-forming chamber. Since the chamber is at a lower temperature than the resistors, there is a transfer of heat from the resistors to the chamber. There is a relatively large class of compounds that will decompose from one of a liquid state or a solid state to a gaseous state when heat is applied. For example, sodium azide ($NaN_3$) will decompose upon application of heat to generate pure nitrogen ($N_2$) gas. Similarly, most alkali bicarbonates (e.g., sodium bicarbonate) will generate carbon dioxide gas ($CO_2$) upon thermal decomposition. Any one of these compounds can be used in the gas-forming chambers. However, identifying these compounds is not intended to limit the scope of the invention. Instead, the identifications are intended to serve as examples of commonly used compounds for chemical reactions to generate gaseous products.

Upon thermal decomposition of the gas-generating compounds, the pressure within a particular gas generator increases as a result of the volume expansion of the gas molecules. Since the volumes involved in the microfluidic system are small, the amount of gas required to steer the subject material along a selected channel is correspondingly small. Accordingly, only a minuscule amount of gas-generating compound is required to be decomposed to generate sufficient gas (measured in nanoliters) to steer the subject material to the next testing region. The typical amount of gas-generating compound is generally in the order of picomoles. While the actual amount of gas-generating compounds necessary to generate one nanoliter is a function of the actual reaction, in the case of sodium bicarbonate, approximately five nanograms of material will generate one nanoliter of gas.

The microfluidic system includes the substrate with internal features that include the gas-forming chambers, microfluidic channels, microfluidic compartments, and microfluidic flow control elements other than the gas chambers. Therefore, the microfluidic system may include known features such as capillary channels, separation channels, and detection channels. The microfluidic system is designed such that the subject material can be processed in either a serial or parallel fashion, depending on the desired testing. In the preferred embodiment, the result of an initial test (e.g., Test #1) determines which of the alternative subsequent tests (e.g., Test #2 or Test #3) is to be performed. Accordingly, the appropriate generator that is strategically located along the network of channels is activated to direct the subject material to its desired location in response to the result of the initial test. In an alternative embodiment, activation of a gas generator is made in response to an external control, such as a computer program or a human operator.

As an example, if the result of Test #1 is positive, the subject material is directed to Test Area #2 by a first gas generator, where a subsequent analysis is performed based on the result of Test #1. Conversely, if the result of Test #1 is negative, then the subject material is directed to Test Area #3 by a different gas generator.

As previously noted, one advantage of the invention is that only a minuscule amount of gas-generating compound is needed to provide sufficient decomposition to generate enough gas to drive the subject material to the next test area of the device. Moreover, since the amount of gas-generating compound is small, the energy required to decompose the compound can be easily localized to the point of decomposition. The heat generated by the resistors is therefore unlikely to cause damage to the subject material.

Optionally, each gas-forming chamber may include an array of discrete volumes of the gas-generating compound. A corresponding number of microheaters may be provided, so that the microheaters of a particular chamber can be activated individually or in unison to generate a precise quantity of gas. As an example, eight binary-weighted quantities of gas-generating material can be contained within a single gas generator. By appropriate activation of the eight associated microheaters, one of 256 different quantities of gas can be generated. This embodiment may be used in situations in which the required pumping forces must be carefully controlled. Alternatively, the precise quantity of gas can be generated by analog control. That is, rather than controlling the quantity of gas-generating compounds that is selectively heated to generate the precise quantity of gas, the specific amount of heat that is applied to the gas-generating compounds is controlled.

As such, a precise quantity of gas is generated in relative proportion to the amount of heat that is applied.

DETAILED DESCRIPTION

Figure 1:
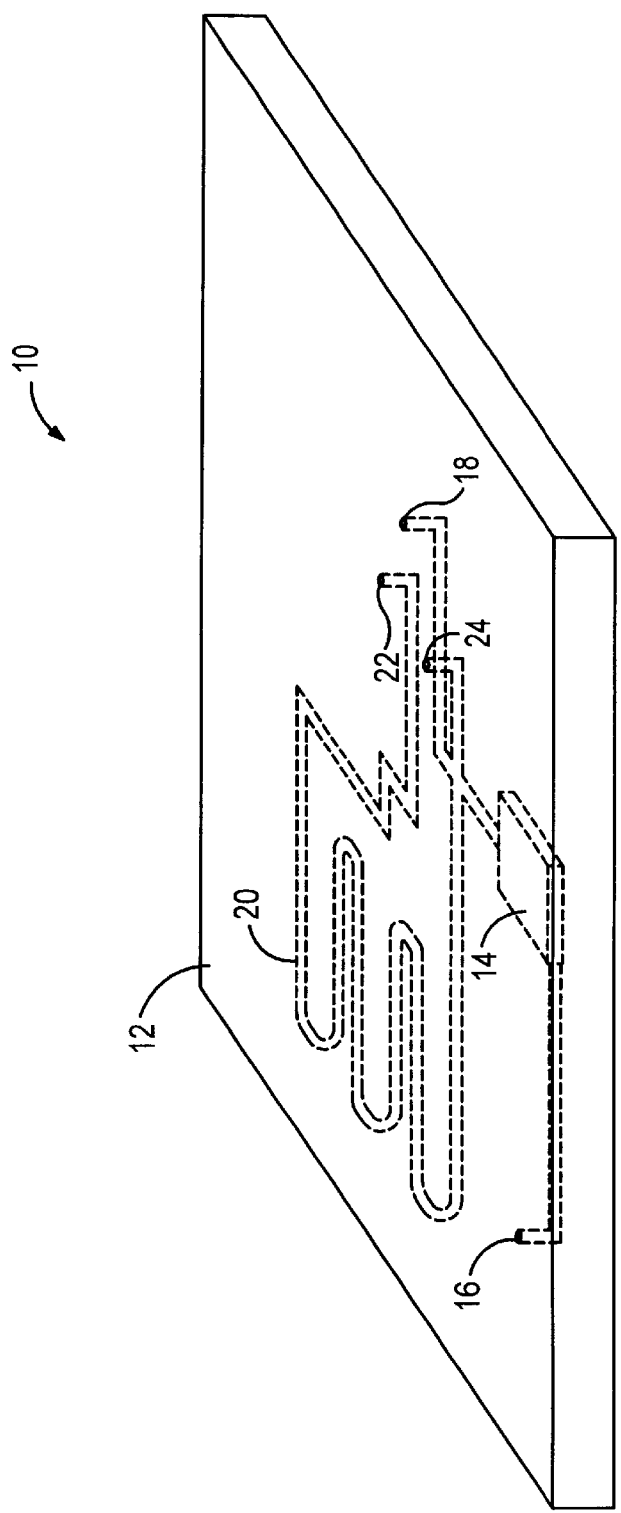
FIG. 1 is a perspective view of an example of a prior art microfluidic system having an internal region, internal separation channel, and input and output ports.
Figure 2:
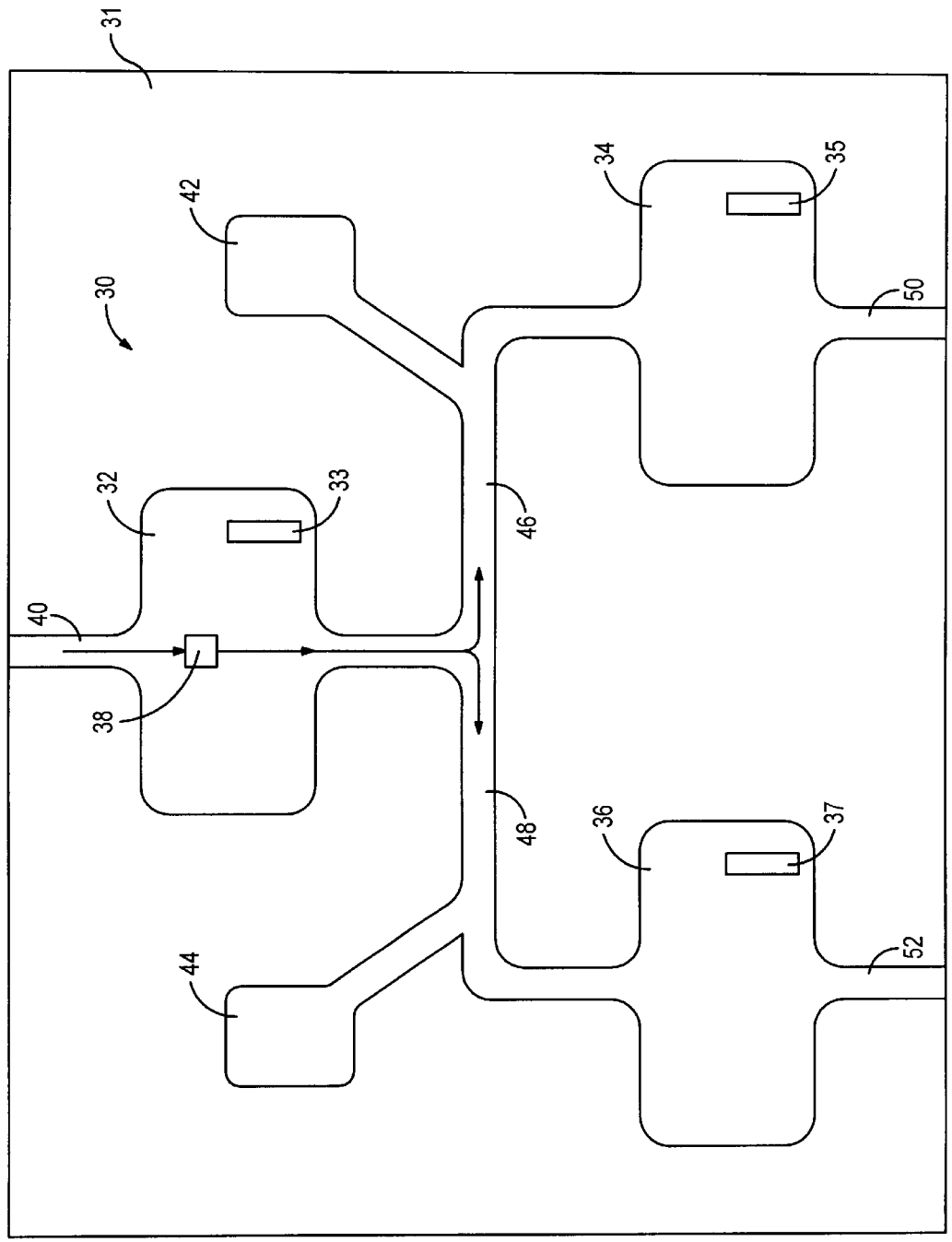
FIG. 2 is a top view of a microfluidic system in accordance with the present invention, utilizing gas generators to steer subject material to different regions, depending on the result of an initial test.

FIG. 2 is an illustration of one preferred architecture of a microfluidic system 30 that utilizes gas generators to steer subject material to different regions in accordance with the invention. The system 30 is formed in a substrate 31 of the type described with reference to FIG. 1. The system is shown as including three regions that are utilized for processing, but more regions may be included. The processes include, but are not limited to, mixing, synthesizing, labeling, testing, filtering, extracting, precipitating, and digesting.

While the microfluidic system 30 is described as including a substrate 31, this is not critical to the invention. Rather, the microfluidic system 30 can be fabricated on or within a body, housing and support structure, and the like, without diverting from the scope of the invention.

In the preferred embodiment the three regions that are utilized for processing include region 32 for performing Test #1, region 34 for performing forming Test #2, and region 36 for performing Test #3. A subject material 38 is introduced into the microfluidic system 30 along channel 40 into the region 32 for performing the initial Test #1. Region 32 i s shown as containing a detector 33 for determining the result of Test #1. The detector may be an optically driven member, a chemically driven member, or any other type of device known in the art. Based on the outcome of Test #1, the subject material is directed to either region 34 by a gas generator 44 or region 36 by a gas generator 42. Regions 34 and 36 contain detectors 35 and 37, respectively, for determining results of Test #2 and Test #3.

As an example, if the result of Test #1 in the region 32 is determined mined to be positive, the subject material is directed to region 34 by the gas generator 44 along channels 48 and 46 to perform Test #2. Following the performance of Test #2, the subject material 38 may be subjected to additional tests as it exits region 34 along channel 50 to another test area (not shown). Conversely, if the result of Test #1 in the region 32 is determined to be negative, the subject material is directed to region 36 by the gas generator 42 along channels 46 and 48 to perform Test #3. Following the performance of Test #3, the subject material 38 may be subjected to additional tests as it exits region 36 along channel 52. Although the arrangement of two gas generators and three regions is described, other arrangements are possible, including, for example, serial gas generators and testing regions connected by a network of channels. The exact microfluidic system configuration is not critical to the invention.

Figure 3:
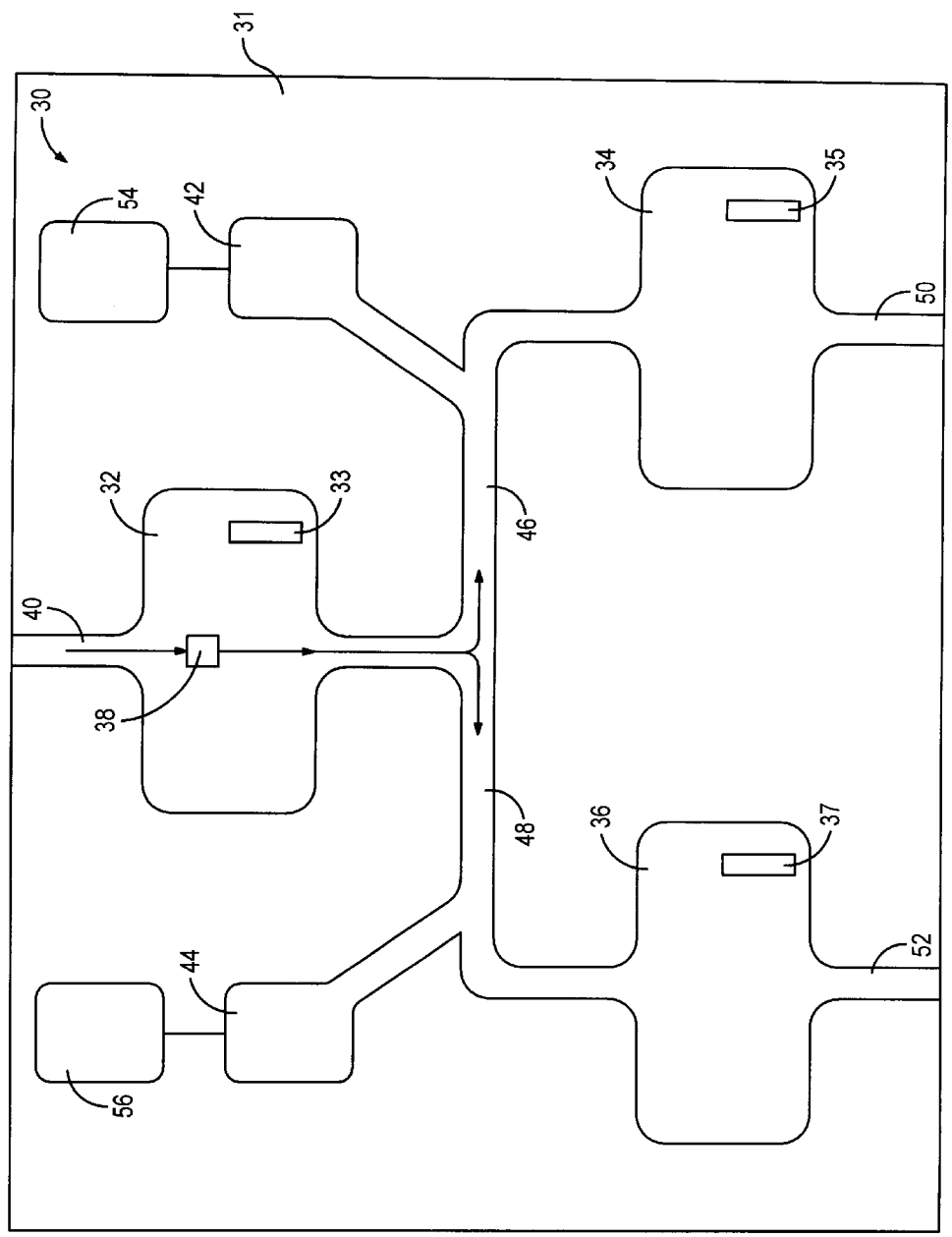
FIG. 3 is a top view of a microfluidic system in accordance with the present invention, utilizing gas generators to steer subject material to different regions in response to external controls.

Referring to FIG. 3, which includes the same reference numerals for repeated elements of FIG. 2, a microfluidic system 30 is shown as utilizing gas generators 42 or 44 to steer the subject material 38 to the appropriate region 34 or 36. Rather than generating the gas to steer the subject material 38 as an automatic response to the result of Test #1 in region 32, the gas generators 42 and 44 of FIG. 3 are controlled by their respective externally operated controls 54 and 56. That is, gas generators 42 and 44 are controlled by their corresponding external controls 54 and 56, which may be operated by a computer program or a human operator. The implementation of the controls is not critical. In one embodiment, each control is a single switch that is externally activated. In an alternative embodiment, each gas generator 42 and 44 includes an array of discrete samples of a gas-generating compound (as will be explained more fully below), and each control is a corresponding array of switches. A one-to-one correspondence between the samples and the switches allows the volume of generated gas to be precisely determined merely by selectively activating the switches of an array. In yet another embodiment, the controls are conductive traces on the surface of the substrate 31. Other embodiments have also been contemplated.

Figure 4:
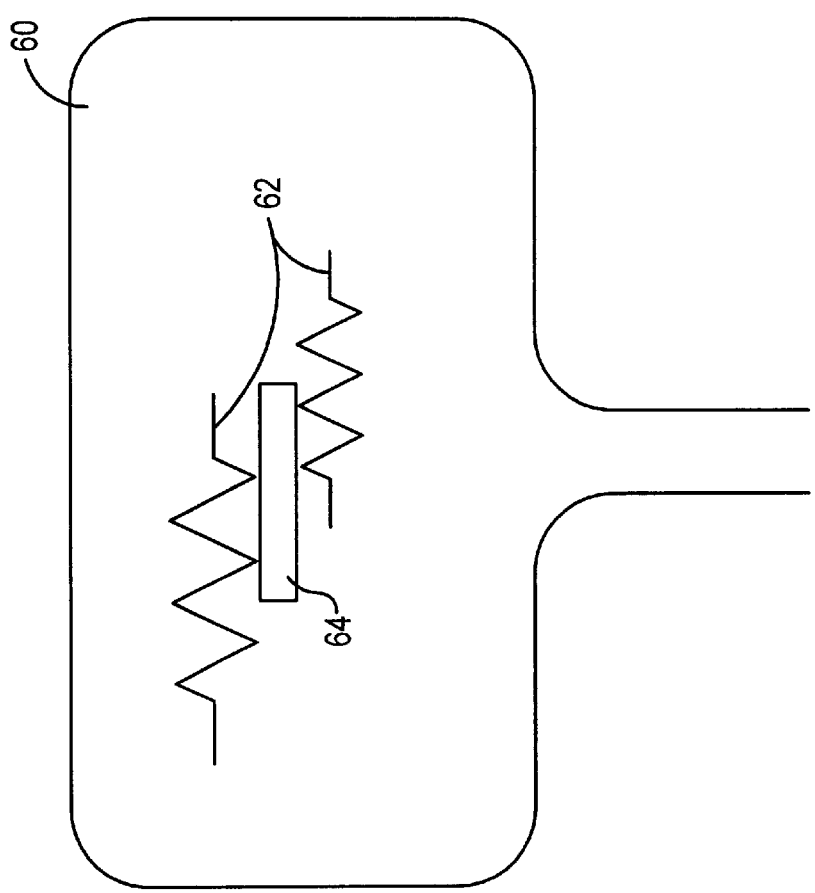
FIG. 4 is a gas generator according to the system of FIG. 2, utilizing microscopic resistors for forming a gas by thermal decomposition from one of a liquid state or a solid state to a gaseous state.

With reference to FIG. 4, a gas generator 60 that is similar to the gas generators 42 and 44 is shown as including microscopic resistors 62 that are electrically activated and detector 64. As current passes through the resistors 62, the electric energy is transferred to heat. On a microscopic level, the collisions between the electrons and the lattice of the resistors 62 increase the amplitude of the thermal vibrations of the lattice. On a macroscopic level, the thermal vibrations correspond to a temperature increase in the gas generator 60. The resistors are shown as being contained within a containment area that is formed in the substrate that supports the microfluidic system 30 described with reference to FIG. 2. Alternatively, the resistors can be formed on the surface of the substrate or can be separately embedded within the substrate, if the resistors are in heat-transfer engagement with the containment area. It is also possible to use a single resistor.

If the environment defined by the containment area of the gas generator 60 is at a lower temperature than the resistors 62, there is a transfer of heat out of the resistors 62 into the environment. The transfer of electrical energy to thermal energy in a resistor is given by Joule's law.

$$P = i^2 R = \frac{V^2}{R}$$

where P is the power dissipation in the form of heat in each resistor 62, i is the current passing through the resistor, R is the resistance of the resistor, and V is the voltage. The heat is conducted to the containment area to raise the temperature of its contents. Here, the contents are one or more samples of a gas-generating compound.

As known in the chemistry art, there is a class of compounds that will decompose from one of a liquid state or a solid state to a gaseous state when heat is applied. For example, sodium azide ($NaN_3$) will decompose upon application of heat to generate pure nitrogen ($N_2$) gas. Similarly, most alkali bicarbonates (e.g., sodium bicarbonate) will generate carbon dioxide gas ($CO_2$) when thermally decomposed.

Upon decomposition of the gas-generating compound from the liquid or solid state to a gaseous state, the pressure within the containment area of the gas generator 60 increases with the volume expansion of the gas molecules. Consequently, the gas pressure drives the subject material along a selected channel or series of channels into a region of interest. Since the volumes of the regions and channels of the microfluidic system 30 is small, the amount of gas molecules needed to steer the subject material along the selected channels is correspondingly small. Thus, only a minuscule amount of gas-generating compound is required to be decomposed to generate sufficient gas molecules to steer the subject material to the next region of interest. In the example of sodium bicarbonate, approximately five nanograms of material will generate one nanoliter of gas molecules.

Figure 5:
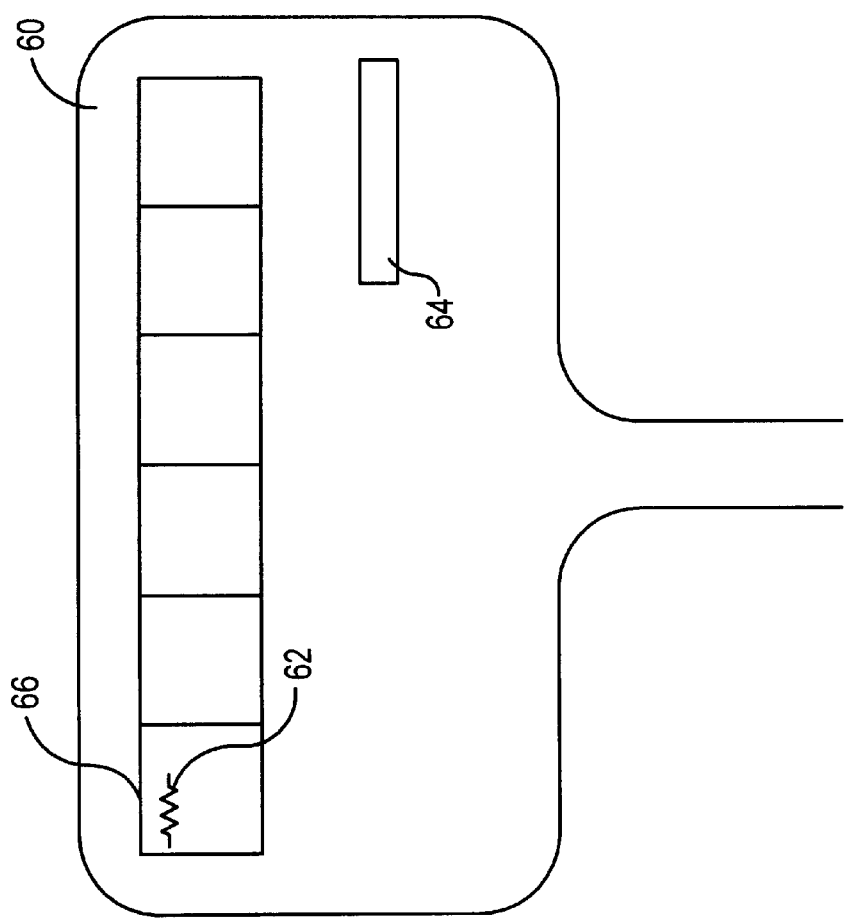
FIG. 5 is a gas generator according to the system of FIG. 2 having a plurality of chambers for forming a precise quantity of gas.

As previously noted, there may be more than one sample of the gas-generating compound, with a dedicated resistor for each sample. Thus, the increase in pressure within a gas generator may be precisely controlled by heating a selected number of samples. FIG. 5 shows the gas generator 60 of FIG. 4 as having a number of chambers, with each chamber 66 corresponding to a dedicated resistor 62 and having a gas-generating compound, so that the chambers of the gas generator 60 can be activated individually or in unison to generate a precise quantity of gas. Moreover, the microfluidic system may be reused without replenishing the supply of gas-generating compound, since different samples may be heated following different tests within the same test area, such as region 32 in FIG. 2.

An alternative method for generating gas is through electrolysis. Specifically, applying an electrical current through an electrolyzable liquid will decompose the liquid into its constituent elements. As an example, when an electrical current is applied to water, hydrogen gas and oxygen gas are generated that can be used to steer the subject material to the next region of interest.

Figure 6:
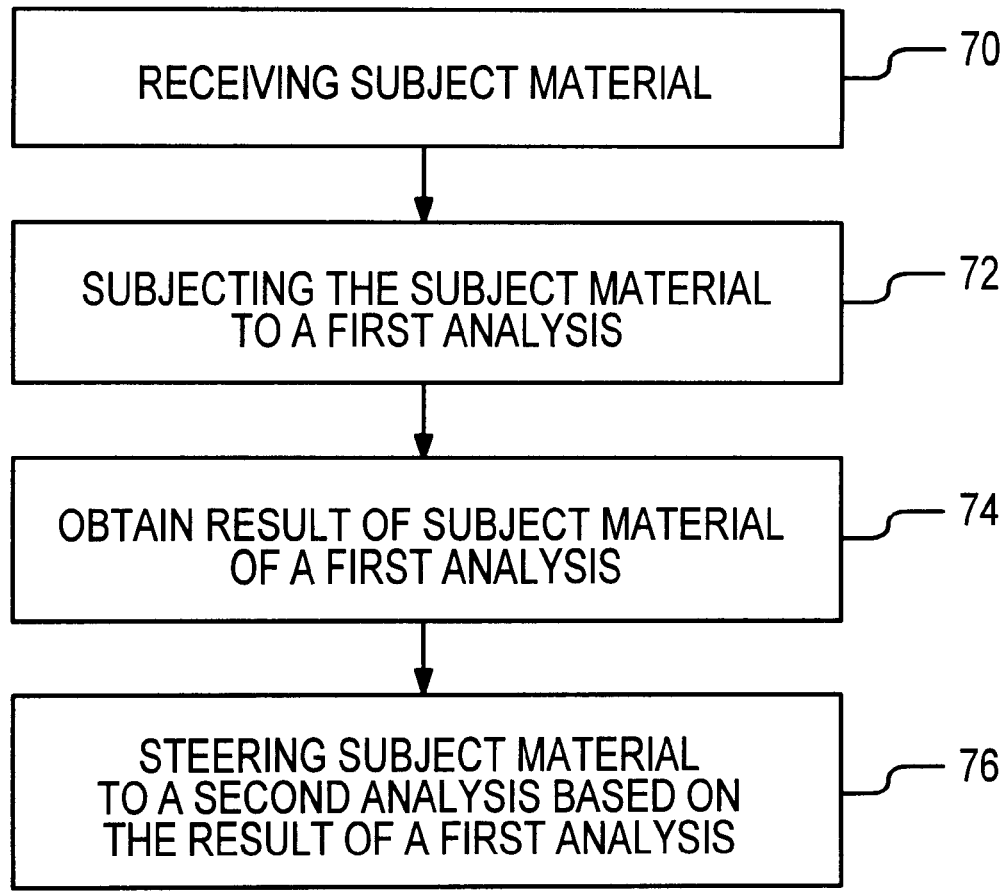
FIG. 6 is a process flow diagram for utilizing the system of FIG. 2 to steer the subject material to its appropriate region.

Operation of the microfluidic system 30 of FIG. 2 is described with reference to FIG. 6. A process flow diagram for steering the subject material 38 along the network of channels into its appropriate testing regions is sequentially shown. In step 70, the subject material is received into the first testing region 32. Subsequently, a first analysis is performed on subject material in step 72. Based on obtaining results in step 74, the subject material is steered to a second analysis in step 76. The steering is accomplished by activating the gas generator 44 or the gas generator 42, depending upon whether the subject material is to be driven to the region 36 or the region 34.

While the invention has been shown as comprising three testing regions and two gas generators, a more complex network may be fabricated within a substrate. Moreover, the testing regions may be channels, such as capillary channels, in which processing and/or detection occur. The steering of the subject material can take place at the outlet of the channel. Additionally, the fabrication of the microfluidic system on or within a substrate is not critical to the invention. Rather, the microfluidic system can be fabricated on or within a body, housing and supporting structure, and the like, without diverting from the scope of the invention.

What is claimed is:

1. A microfluidic system for directing subject materials to a next processing region comprising:

a first channel having a first processing region for accommodating a first processing of said subject materials;

a second channel in fluid communication with said first channel, said second channel having a plurality of processing regions including said next processing region; and a gas generator having a gas-forming area such that a formation of gas in said gas-forming area generates a pressure which forces said subject materials from said first channel to said next processing region, said next processing region being configured to accommodate a next processing of said subject materials, said gas generator including a plurality of discrete quantities of a gas-forming material in said gas-forming area and including a heating mechanism which is controllable to selectively activate individual said discrete quantities, thereby enabling selectivity in forming a level of said pressure.

2. The microfluidic system of claim 1 wherein said first processing region is a testing region for performing an analysis of said subject materials.

3. The microfluidic system of claim 1 wherein said heating mechanism includes a plurality of heating elements in thermal communication with said gas-forming area to selectively elevate the temperature within said gas-forming area, each said discrete quantity being a sample of a material that decomposes to a gaseous state in response to an application of heat.

4. The microfluidic system of claim 3 wherein each said heating element is a resistor configured to discharge heat in response to an input of electrical energy, said heating elements have a one-to-one correspondence with said discrete quantities, said heating elements being individually controllable, each said heating element being dedicated to a particular one of said discrete quantities.

5. The microfluidic system of claim 1 further comprising at least one detector connected to said body and operatively associated with said first and next processing regions for detecting processes that include said first process and said next process.

6. The microfluidic system of claim 1 wherein said gas generator is positioned relative to said first and second channels to direct said gas to steer said subject materials to said next processing region when at least one of said discrete quantities of gas-forming material is activated, said heating mechanism being automatically controlled in response to a specific result of said first process of said subject materials.

7. The microfluidic system of claim 1 wherein said gas generator is positioned relative to said first and second channels to direct said gas to steer said subject materials to said next processing region when at least one of said discrete quantities of gas-forming material is activated, said heating mechanism being controlled by an external control.

8. The microfluidic system of claim 1 further comprising a plurality of gas generators, said plurality of gas generators including a second gas generator having a second gas-forming area such that a formation of a gas in said second gas-forming area steers said subject materials to a third processing region, wherein said third processing region is configured to perform a process of said subject materials.

9. The microfluidic system of claim 1 further comprising a substrate that is configured to include said first channel, said second channel and said gas generator.

10. A microfluidic device for manipulating subject materials comprising:

a network of channels having a series of testing regions;

means for processing said subject materials within a testing region of said series of testing regions; and gas generating means for generating a pressurized gas to drive said subject materials along a selected channel of said network of channels, said gas generating means including a thermally activated compound which decomposes when heated to form said pressurized gas, said compound being a solid.

11. The microfluidic device of claim 10 wherein said gas generating means is electrically activated and is controlled to be responsive to prior determinations of said processing of said subject materials.

12. The microfluidic device of claim 10 wherein said gas generating means includes microscopic resistors.

13. The microfluidic device of claim 10 wherein said gas generating means includes discrete quantities of said compound, each said discrete quantity being uniquely associated with an individually controllable heater, wherein activation of a specific said heater induces thermal decomposition of said uniquely associated discrete quantity to a gaseous state.

14. The microfluidic device of claim 10 further comprising a substrate that is configured to include said network of channels and said gas generating means.

15. A method of performing a process of subject materials utilizing a microfluidic system comprising the steps of:

receiving said subject materials in said microfluidic system;

subjecting said subject materials to a first process;

steering said subject materials to a second process in response to said first process, said step of steering including intentionally inducing decomposition of a selected number of a plurality of discrete quantities of thermally activated samples to form a pressurized gas in a location selected to drive said subject materials to said second process, said discrete quantities being stored in common.

16. The method of claim 15 wherein said intentionally inducing decomposition includes elevating the temperature of said selected number of discrete quantities, said selected number being less than all of said discrete quantities, said samples being a selected solid or a selected liquid.

17. The method of claim 15 wherein said intentionally inducing decomposition includes applying a voltage to at least one heating element.

18. The method of claim 17 wherein said applying said voltage includes conducting current through a number of heating elements equal to said selected number of discrete quantities.

19. A microfluidic device for manipulating subject materials comprising:
a network of channels having a series of testing regions;
means for processing said subject materials within a testing region of said series of testing regions; and
gas generator means for generating a pressurized gas to drive the direction of said subject materials along a selected channel of said network of channels, said gas generator having a heating element and a sample of material that decomposes from a liquid or solid state to a gaseous state in response to heat, said material being one of alkali azide and an alkali bicarbonate.

* * * * *